United States Patent

Laor

(10) Patent No.: US 9,164,790 B2
(45) Date of Patent: Oct. 20, 2015

(54) LIVE VIRTUAL MACHINE TEMPLATE CREATION

(75) Inventor: Dor Laor, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 160 days.

(21) Appl. No.: 13/491,376

(22) Filed: Jun. 7, 2012

(65) Prior Publication Data

US 2013/0332920 A1    Dec. 12, 2013

(51) Int. Cl.
*G06F 9/455* (2006.01)
*G06F 9/50* (2006.01)

(52) U.S. Cl.
CPC .......... *G06F 9/45558* (2013.01); *G06F 9/5077* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 8,056,076 B1 * | 11/2011 | Hutchins et al. | 718/1 |
| 2008/0155223 A1 * | 6/2008 | Hiltgen et al. | 711/173 |
| 2008/0184225 A1 * | 7/2008 | Fitzgerald et al. | 718/1 |
| 2009/0007105 A1 * | 1/2009 | Fries et al. | 718/1 |
| 2009/0228883 A1 * | 9/2009 | Gebhart et al. | 718/1 |
| 2009/0328030 A1 * | 12/2009 | Fries | 717/174 |
| 2010/0122248 A1 * | 5/2010 | Robinson et al. | 718/1 |
| 2010/0228919 A1 * | 9/2010 | Stabrawa et al. | 711/120 |
| 2012/0144391 A1 * | 6/2012 | Ueda | 718/1 |
| 2012/0151477 A1 * | 6/2012 | Sinha et al. | 718/1 |
| 2012/0233611 A1 * | 9/2012 | Voccio | 718/1 |
| 2013/0132950 A1 * | 5/2013 | McLeod et al. | 718/1 |

* cited by examiner

*Primary Examiner* — Tammy Lee
(74) *Attorney, Agent, or Firm* — Lowenstein Sandler LLP

(57) ABSTRACT

A system and method are disclosed for creating a virtual machine template from a live virtual machine. In accordance with one embodiment, a computer system creates a live snapshot of a virtual machine, and creates a clone of the virtual machine based on the live snapshot. The computer system then initiates execution of the clone, shuts down the clone, and creates a virtual machine template based on the clone, where the virtual machine template enables the creation of another virtual machine that corresponds to the live snapshot of the original virtual machine.

17 Claims, 3 Drawing Sheets

LIVE VIRTUAL MACHINE TEMPLATE CREATION

TECHNICAL FIELD

This disclosure relates to computer systems, and more particularly, to creating virtual machine templates in virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine" or a "physical machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps, typically in a one-to-one fashion, to a device of the host machine (e.g., a network interface device, a CD-ROM drive, a hard disk, a solid-state drive, etc.). The hypervisor manages these mappings in a transparent fashion, thereby enabling the guest operating system and applications executing on the virtual machine to interact with the virtual processors and virtual devices as though they were actual physical entities.

A virtual machine template is a file that is configured to include a standardized set of hardware and software configuration settings for a virtual machine. Once created, the virtual machine template can be used to quickly and repeatedly create virtual machines having those settings, and thus avoid the laborious process of configuring each of the virtual machines.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
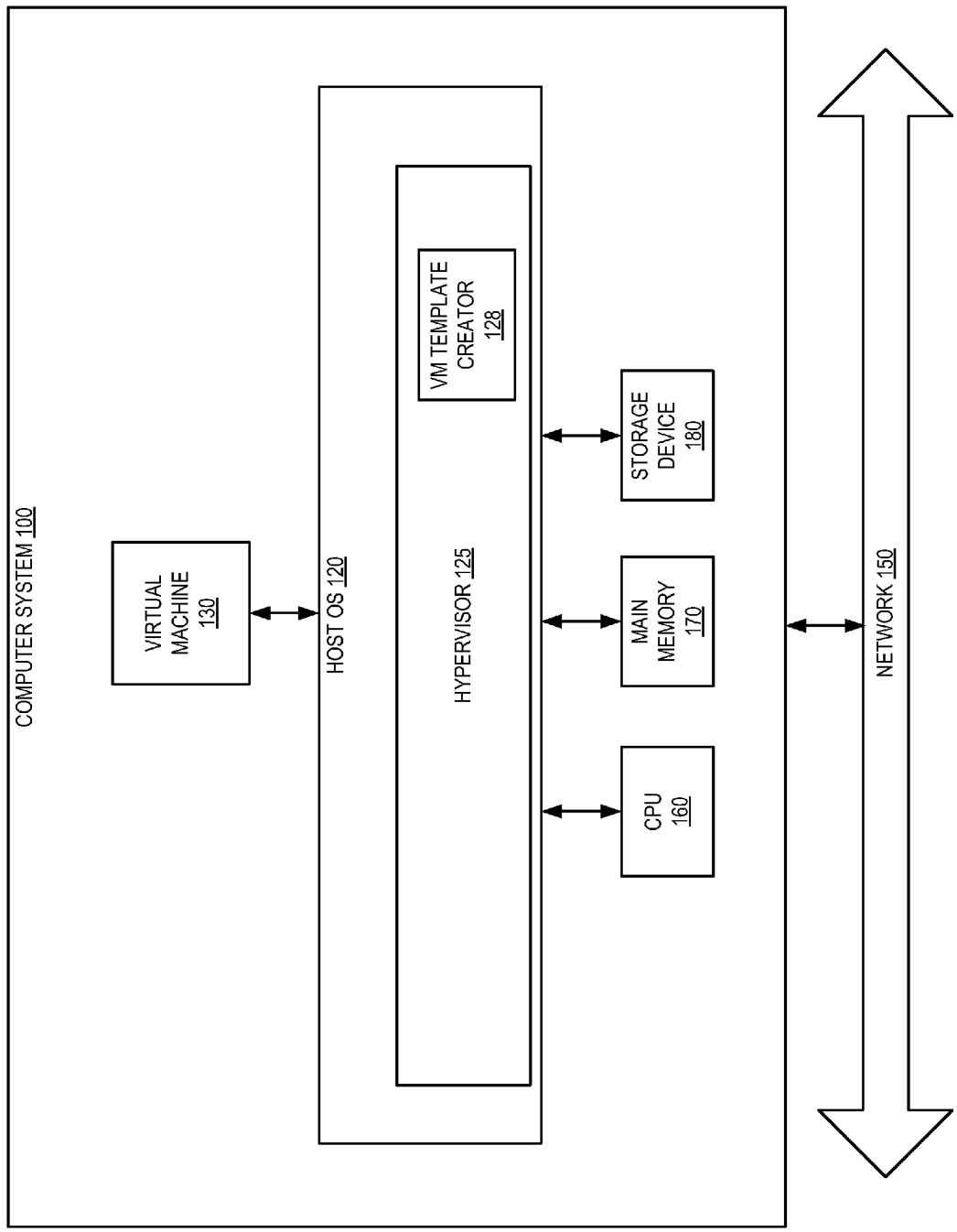
FIG. 1 depicts an exemplary computer system architecture, in accordance with an embodiment of the present invention.

Described herein is a system and method for creating a virtual machine template from a live virtual machine (a virtual machine that is currently executing). In accordance with one embodiment, a computer system takes a live snapshot of an executing virtual machine and creates a clone of the virtual machine based on the live snapshot. The computer system then disconnects the clone from a network, as the clone has the same Internet Protocol (IP) address and networking configuration as the original virtual machine, and initiates execution of the clone. The clone is then shut down gracefully, and a virtual machine template is created based on the clone.

Embodiments of the present disclosure are thus capable of creating a virtual machine template from a virtual machine in an automated fashion, without requiring any downtime for the virtual machine or changes in its execution, where the template enables the creation of additional virtual machines that correspond to the live snapshot of the original virtual machine. In contrast, in virtualized systems of the prior art, a virtual machine should first be shut down before a virtual machine template can be created from the virtual machine.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "cloning", "blocking", "delaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus.

Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 depicts an exemplary architecture of the salient elements of a computer system 100, in accordance with an embodiment of the present invention. One skilled in the art will appreciate that other architectures for computer system 100 are possible, and that the implementation of a computer system utilizing embodiments of the invention are not necessarily limited to the specific architecture depicted by FIG. 1.

As shown in FIG. 1, the computer system 100 is connected to a network 150 and comprises central processing units (CPU) 160, main memory 170, which may include volatile memory devices (e.g., random access memory (RAM)), non-volatile memory devices (e.g., flash memory), and/or other types of memory devices, and storage device 180 (e.g., a magnetic hard disk, a Universal Serial Bus [USB] solid state drive, a Redundant Array of Independent Disks [RAID] system, a network attached storage [NAS] array, etc.). The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

It should be noted that although, for simplicity, a single CPU is depicted in FIG. 1, in some other embodiments computer system 100 may comprise a plurality of CPUs. Similarly, in some other embodiments computer system 100 may comprise a plurality of storage devices 180, rather than a single storage device 180.

Computer system 100 runs a host operating system (OS) 120, which is software that manages the hardware resources of the computer system and that provides functions such as interprocess communication, scheduling, virtual memory management, and so forth. In one embodiment, host operating system 120 also comprises a hypervisor 125, which is software that provides a virtual operating platform for one or more virtual machines 130 and that manages execution of one or more virtual machines 130. In accordance with this embodiment, hypervisor 125 includes a VM template creator 128 that is capable of creating a VM template from a live virtual machine, without requiring any downtime for the virtual machine, as described below with respect to FIG. 2. A live virtual machine is a virtual machine that is currently running, and the VM template creator 128 creates a VM template while the virtual machine is running without stopping, interrupting or shutting down the virtual machine. It should be noted that in some alternative embodiments, hypervisor 125 may be external to host OS 120, rather than embedded within host OS 120.

Virtual machine 130 is a software implementation of a machine that executes programs as though it were an actual physical machine. Virtual machine 130 comprises a guest operating system that manages the execution of programs within the virtual machine, as well as one or more virtual processors that are mapped by hypervisor 125 to physical CPU(s) 160 of computer system 100. It should be noted that although, for simplicity, a single virtual machine is depicted in FIG. 1, in some other embodiments computer system 100 may host a plurality of virtual machines.

Figure 2:
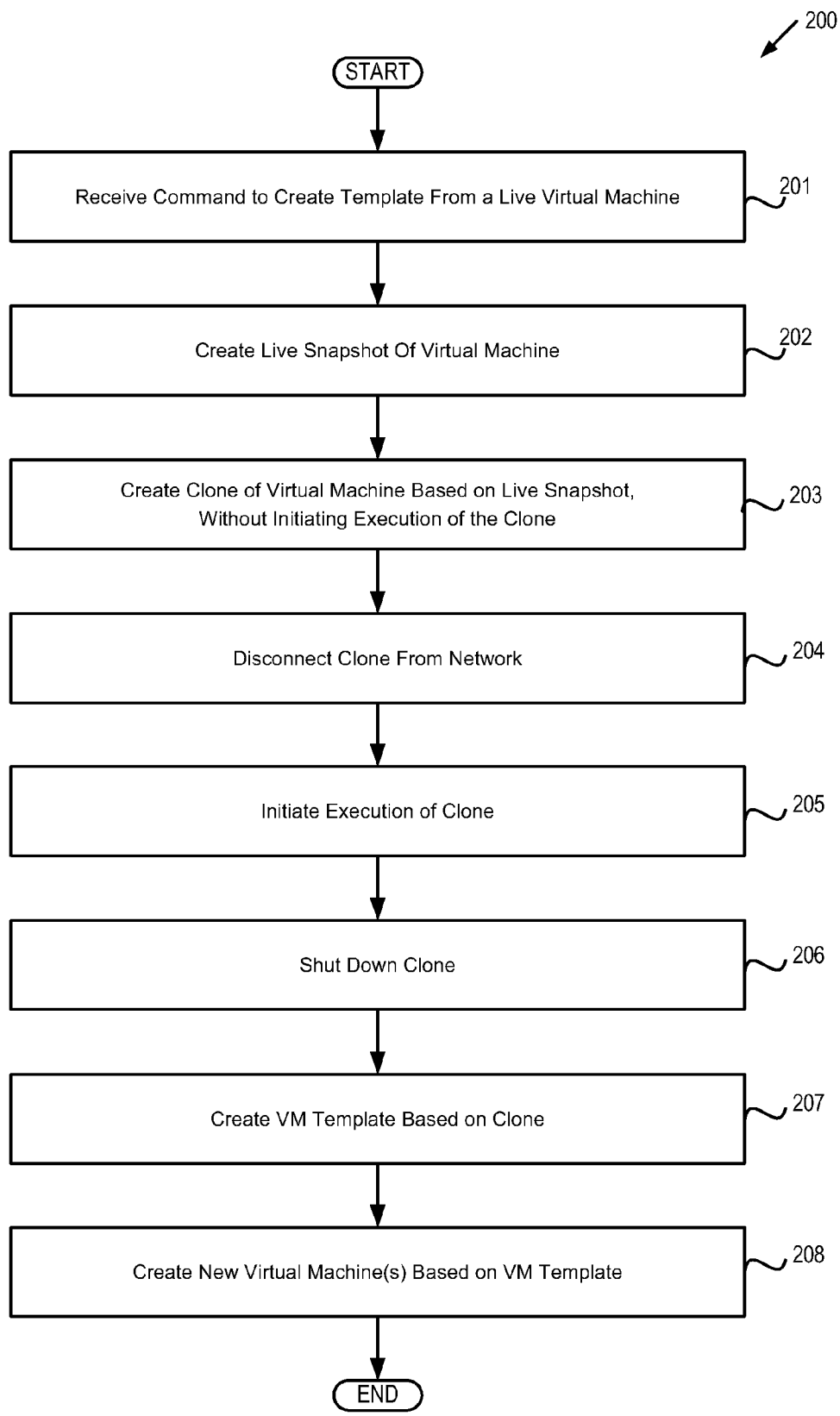
FIG. 2 depicts a flow diagram of one embodiment of a method for creating a virtual machine template from a live virtual machine.

FIG. 2 depicts a flow diagram of one embodiment of a method 200 for handling live cloning of a virtual machine. The method is performed by processing logic that may comprise hardware (circuitry, dedicated logic, etc.), software (such as is run on a general purpose computer system or a dedicated machine), or a combination of both. In one embodiment, the method is performed by the computer system 100 (e.g., VM template creator 128 of hypervisor 125) of FIG. 1, while in some other embodiments, some or all of the method might be performed by another machine. It should be noted that blocks depicted in FIG. 2 can be performed simultaneously or in a different order than that depicted.

At block 201, hypervisor 125 receives one or more commands to create a VM template from live virtual machine 130. The command(s) may be issued by a human administrator, or by a program executed by host OS 120, and may be issued for a variety of reasons (e.g., for creating multiple virtual machines that have the same configuration and state as VM 130, for creating a virtual test environment of virtual machine 130, for live migration to another host, etc.). In one embodiment, the command(s) are received by VM template creator 128 of hypervisor 125.

At block 202, a live snapshot of virtual machine 130 is created. In one embodiment, the live snapshot is of the portion of main memory 170 that is allocated to VM 130, and of the portion of storage device 180 that is allocated to VM 130, and is created by hypervisor 125.

At block 203, a clone of virtual machine 130 is created based on the live snapshot taken at block 202; note that the clone is created, but is not yet executed. In one embodiment, the clone is created by hypervisor 125 via one of two techniques: via a direct-copy command, or via a copy-on-write command. In direct-copy, the original virtual machine 130 is cloned by allocating and creating a new virtual machine that is an exact replica of the original virtual machine 130, while in copy-on-write, the original virtual machine 130 is cloned by creating new pointers to each memory unit (e.g., disk block sector, RAM page, etc.) of the original virtual machine 130. It should be noted that that the clone will continue executing from the exact same state as the state of the original virtual machine 130 at the time of the live snapshot creation, rather than being booted from scratch.

At block 204, the clone is disconnected from network 150. This prevents any packets that are directed to virtual machine 130 from also being received by the clone, which has the same IP address and network configuration as virtual machine 130, so that such packets do not effect the state or configuration of the clone. In some embodiments, VM template creator 128 disconnects the clone from network 150 without user interaction, while in some other embodiments the clone may be disconnected from network 150 by an administrator.

At block 205, hypervisor 125 initiates execution of the clone (e.g., on computer system 100, on another host, etc.), and at block 206, hypervisor 125 shuts down the clone. In one embodiment, the clone is gracefully shut down by saving to storage device 180 the contents of a portion of memory 170 allocated to the clone (e.g., flushing to storage device 180 any unwritten memory buffers used by applications in the clone, etc.). As part of the shutdown, the guest operating system of the clone notifies all of the applications executing within in the clone that the guest OS is about to shutdown and that the applications should therefore write their internal state (e.g., important internal stateful buffers, etc.) to storage.

In one embodiment, hypervisor 125 sends a graceful shutdown command to the guest OS of the clone in one of two ways: via a channel to a guest agent within the clone, or by emulating a user depressing the main power button (exactly as regular physical machines have a power button) via Advanced Configuration and Power Interface (ACPI) tables managed by the operating system. It should be noted that without such shutdown, the disk image of the clone may not be completely in sync with the RAM state of the applications, and a template generated from the clone may result in the creation of additional virtual machines that do not behave properly (e.g., as though a power failure occurred).

At block 207, a VM template is created based on the clone. The VM template may be a file that is stored in raw format, or in a vendor-specific format (e.g., vmdk, vhd, qcow2, etc.) that uses thin-provisioned images to save space. In one embodiment, the VM template is created by VM template creator 128 of hypervisor 125.

At optional block 208, one or more new virtual machines are created based on the VM template that was created at block 207. In one embodiment, block 208 may be performed by hypervisor 208 in response to a command issued by an administrator or a program executed by host OS 120. It should be noted that the original virtual machine 130 can continue its execution during all blocks of the method of FIG. 2, without having to be shut down.

Figure 3:
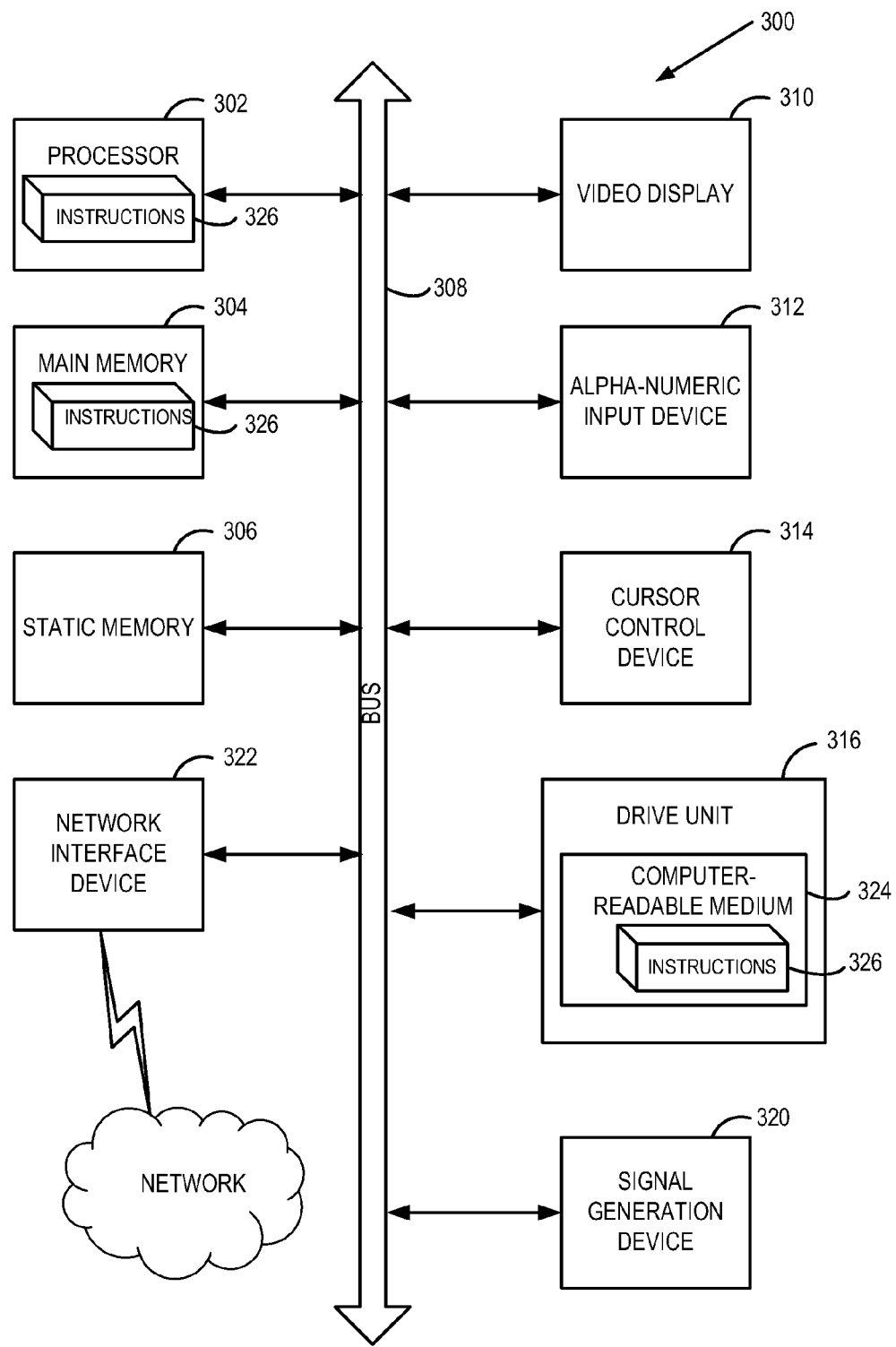
FIG. 3 depicts a block diagram of an illustrative computer system operating in accordance with embodiments of the invention.

FIG. 3 illustrates an exemplary computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processing system (processor) 302, a main memory 304 (e.g., read-only memory (ROM), flash memory, dynamic random access memory (DRAM) such as synchronous DRAM (SDRAM)), a static memory 306 (e.g., flash memory, static random access memory (SRAM)), and a data storage device 316, which communicate with each other via a bus 308.

Processor 302 represents one or more general-purpose processing devices such as a microprocessor, central processing unit, or the like. More particularly, the processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 302 may also be one or more special-purpose processing devices such as an application specific integrated circuit (ASIC), a field programmable gate array (FPGA), a digital signal processor (DSP), network processor, or the like. The processor 302 is configured to execute instructions 326 for performing the operations and steps discussed herein.

The computer system 300 may further include a network interface device 322. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 320 (e.g., a speaker).

The data storage device 316 may include a computer-readable medium 324 on which is stored one or more sets of instructions 326 (e.g., instructions corresponding to the method of FIG. 3, etc.) embodying any one or more of the methodologies or functions described herein. Instructions 326 may also reside, completely or at least partially, within the main memory 304 and/or within the processor 302 during execution thereof by the computer system 300, the main memory 304 and the processor 302 also constituting computer-readable media. Instructions 326 may further be transmitted or received over a network via the network interface device 322.

While the computer-readable storage medium 324 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   creating, by a processing device, a live snapshot of a running virtual machine that is connected to a network and has an internet protocol (IP) address and a network configuration;
   creating, by the processing device, a live clone of the running virtual machine using the live snapshot while the virtual machine is running, wherein the live clone is connected to the network and has the same internet protocol (IP) address and network configuration as the virtual machine;
disconnecting the live clone from the network;
initiating execution of the live clone;
shutting down the live clone to create a virtual machine template; and
creating the virtual machine template in view of the live clone, wherein the virtual machine template enables another virtual machine to be created that corresponds to the live snapshot of the running virtual machine.

2. The method of claim 1 wherein the virtual machine continues executing during the creating of the live clone, the shutting down of the live clone, and the creating of the virtual machine template.

3. The method of claim 1 further comprising creating, by the processing device, one or more additional virtual machines in view of the virtual machine template.

4. The method of claim 1 wherein the live snapshot is of (i) a portion of a random access memory that is allocated to the running virtual machine and (ii) a portion of a storage device that is allocated to the running virtual machine.

5. The method of claim 1 wherein the shutting down of the live clone comprises saving to a disk the contents of a portion of a random access memory that is allocated to the live clone.

6. The method of claim 1 further comprising installing an operating system in the virtual machine prior to the creating of the live snapshot.

7. An apparatus comprising:
a memory; and
a processing device operatively coupled to the memory to:
create a live snapshot of a running virtual machine that is connected to a network and has an internet protocol (IP) address and a network configuration;
create a live clone of the running virtual machine using the live snapshot while the virtual machine is running, wherein the live clone is connected to the network and has the same internet protocol (IP) address and network configuration as the virtual machine;
disconnecting the live clone from the network;
initiate execution of the live clone;
shut down the live clone to create a virtual machine template;
create the virtual machine template in view of the live clone, wherein the virtual machine template enables another virtual machine to be created that corresponds to the live snapshot of the running virtual machine; and
store the virtual machine template in the memory.

8. The apparatus of claim 7 wherein the running virtual machine continues executing during the creating of the clone, the shutting down of the clone, and the creating of the virtual machine template.

9. The apparatus of claim 7 wherein the live snapshot is of (i) a portion of the memory that is allocated to the running virtual machine and (ii) a portion of a storage device that is allocated to the running virtual machine.

10. The apparatus of claim 7 wherein the shutting down of the live clone comprises flushing to a storage device a buffer of the memory that is associated with an application executed by the live clone.

11. The apparatus of claim 7 wherein the processing device is further to change a configuration of an operating system in the virtual machine prior to the creating of the live snapshot.

12. The apparatus of claim 7 wherein the processing device is further to install an application in the virtual machine prior to the creating of the live snapshot.

13. A non-transitory computer readable storage medium, having instructions stored therein, which when executed, cause a processing device at least to:
create, by the processing device, a live snapshot of a running virtual machine that is connected to a network and has an internet protocol (IP) address and a network configuration;
create, by the processing device, a live clone of the running virtual machine using the live snapshot while the virtual machine is running, wherein the live clone is connected to the network and has the same internet protocol (IP) address and network configuration as the virtual machine;
disconnect the live clone from the network;
initiate execution of the live clone;
shutdown the live clone to create a virtual machine template; and
create the virtual machine template in view of the live clone, wherein the virtual machine template enables another virtual machine to be created that corresponds to the live snapshot of the running virtual machine.

14. The non-transitory computer readable storage medium of claim 13 wherein the virtual machine continues executing during the creating of the live clone, the shutting down of the live clone, and the creating of the virtual machine template.

15. The non-transitory computer readable storage medium of claim 13 wherein the shut down of the live clone comprises saving to a storage device the contents of a portion of a random access memory that is allocated to the live clone.

16. The non-transitory computer readable storage medium of claim 13 wherein the processing device is further to change a configuration of an application in the virtual machine prior to the creating of the live snapshot.

17. The non-transitory computer readable storage medium of claim 13 wherein the processing device is further to apply a file system trim operation prior to the creating of the live snapshot.

* * * * *